(12) United States Patent
Srivastava

(10) Patent No.: US 9,996,131 B2
(45) Date of Patent: Jun. 12, 2018

(54) ELECTRICAL FAST TRANSIENT TOLERANT INPUT/OUTPUT (I/O) COMMUNICATION SYSTEM

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/925,713

(22) Filed: Oct. 28, 2015

(65) Prior Publication Data

US 2017/0123470 A1    May 4, 2017

(51) Int. Cl.
  *G06F 13/42*    (2006.01)
  *G06F 1/26*    (2006.01)

(52) U.S. Cl.
  CPC .......... *G06F 1/266* (2013.01); *G06F 13/4282* (2013.01)

(58) Field of Classification Search
  CPC . G06F 1/266; G06F 13/4282; H04L 25/0272; H03F 3/4565
  See application file for complete search history.

(56) References Cited

U.S. PATENT DOCUMENTS

| 6,546,057 | B1 * | 4/2003 | Yeap | H04B 1/10 375/285 |
| 7,570,127 | B2 * | 8/2009 | Ryan | H03C 1/60 332/162 |
| 7,667,535 | B2 * | 2/2010 | Kobayashi | H03F 3/45475 330/9 |
| 7,696,786 | B2 * | 4/2010 | Laulanet | H03K 19/018528 326/68 |
| 7,708,698 | B2 * | 5/2010 | Wu | A61B 5/0809 600/529 |
| 8,022,710 | B2 * | 9/2011 | Ivan | G01R 19/16547 324/503 |
| 8,456,154 | B2 * | 6/2013 | Ho | G01R 13/0218 324/121 R |

(Continued)

FOREIGN PATENT DOCUMENTS

WO    WO2014/117866 A1    8/2014

OTHER PUBLICATIONS

International Search Report and Written Opinion dated Jan. 10, 2017 for International Application No. PCT/US2016/053787, 14 pages.

*Primary Examiner* — Thomas Lee
*Assistant Examiner* — Chad Erdman
(74) *Attorney, Agent, or Firm* — Schwabe, Williamson & Wyatt, P.C.

(57) ABSTRACT

Apparatuses, systems and methods associated with electrical fast transient tolerant input/output (I/O) communication (e.g., universal serial bus (USB)) design are disclosed herein. In embodiments, an apparatus may include common mode extraction circuitry to extract a common mode voltage from a USB input signal for a USB device, compare the common mode voltage with a reference voltage range and determine, based on the comparison, that the common mode voltage is outside of the reference voltage range. In the embodiments, the apparatus may further include processing circuitry to adjust the common mode voltage to within the reference voltage range. Other embodiments may be described and/or claimed.

20 Claims, 8 Drawing Sheets

(56) References Cited

U.S. PATENT DOCUMENTS

| | | | |
|---|---|---|---|
| 8,823,453 B2* | 9/2014 | Nys | H03F 3/3022 |
| | | | 330/258 |
| 8,990,592 B2* | 3/2015 | Kaestner | G06F 13/4072 |
| | | | 713/300 |
| 9,455,752 B2* | 9/2016 | Yong | H04B 1/0475 |
| 2003/0048136 A1 | 3/2003 | Palaskas et al. | |
| 2003/0112058 A1 | 6/2003 | Park | |
| 2007/0030069 A1 | 2/2007 | Huang | |
| 2015/0067209 A1 | 3/2015 | Liu et al. | |
| 2016/0373408 A1* | 12/2016 | Wentworth | H04L 63/0227 |

* cited by examiner

ELECTRICAL FAST TRANSIENT TOLERANT INPUT/OUTPUT (I/O) COMMUNICATION SYSTEM

TECHNICAL FIELD

The present disclosure relates to the field of electronic circuits. More particularly, the present disclosure relates to the electrical fast transient (EFT) tolerant design of an input/output (I/O) communication system.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In universal serial bus (USB) devices, surges on input lines of the USB devices can cause loss, corruption and/or degradation of information being carried to the USB devices. Further, the surges can cause the USB devices to transition into non-operational states, disconnect or reset states. In many situations, the loss, corruption and/or degradation of information can be highly undesirable, presenting the challenges of maintaining capture of information through the surge conditions and minimizing the situations where the USB devices transition into non-operational states in response to the surge conditions.

In personal health care applications, in particular, it is desirable for utilized USB devices to be tolerant to electrical fast transient (EFT) disturbances of between −1.5 kilovolts and +1.5 kilovolts coupled to USB communication lines interconnecting the USB devices. Due to EFT disturbances on the USB communication lines of the prescribed level, the input of a USB device may experience an electrical transient voltage of more than one volt on the USB device's differential input lines. The EFT disturbances may result in a change in a common mode voltage of the USB communication lines. This electrical transient voltage often is greater than the normal operation common mode voltage range of −50 millivolts to 500 millivolts for the USB device, causing the USB device to malfunction, transition into a reset or disconnected state, and/or experience false input readings.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
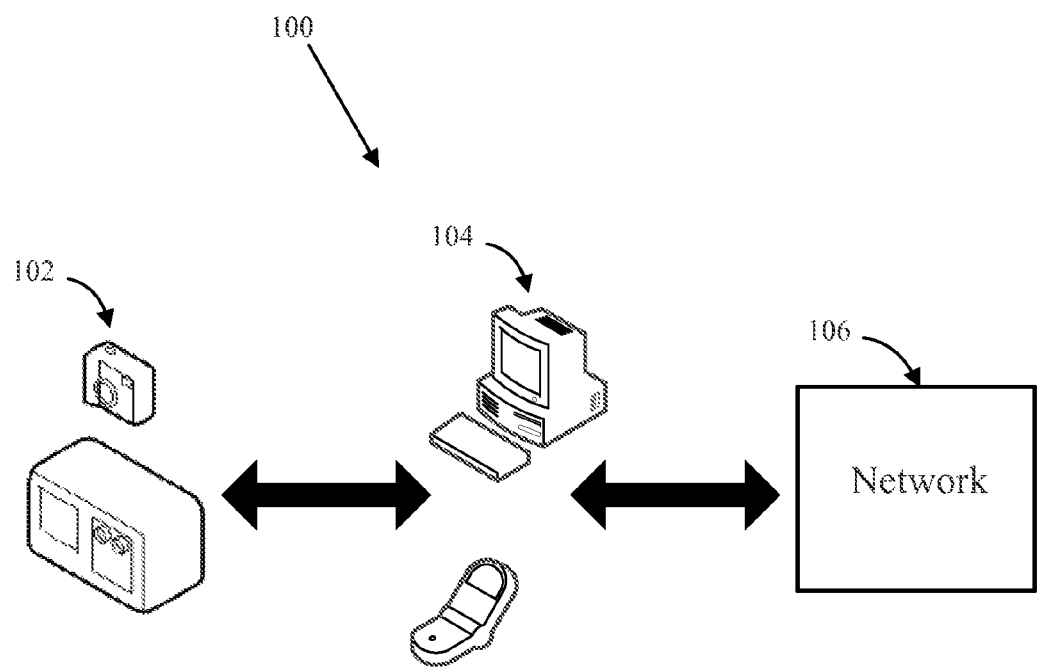
FIG. 1 illustrates an example network system, according to various embodiments.

Apparatuses, methods and storage medium associated with electrical fast transient tolerant input/output (I/O) communication (e.g., universal serial bus (USB)) design are disclosed herein. In embodiments, an apparatus may include one or more processors, devices, and/or circuitry to determine whether a common mode voltage of data inputs to a USB device is within a predetermined acceptable range for the USB device. In response to determining that the common mode voltage of the data inputs to the USB device are outside the predetermined acceptable range, the processors, devices, and/or circuitry may adjust and/or shift the common mode voltage of the data inputs to be within the predetermined acceptable range.

Although various embodiments are described herein with reference to USB communications, the techniques described herein may be used for other types of I/O interfaces in accordance with various embodiments. For example, the techniques described herein may be used by an I/O communication system that communicates via a USB interface, a general-purpose input/output (GPIO) interface, a Camera Serial Interface (CSI), a Mobile Industry Processor Interface (MIPI) M-PHY interface, a Peripheral Component Interconnect express (PCIe) interface, a Serial Advanced Technology Attachment (SATA) interface, an Ethernet interface, and/or another high-speed input/output interface (e.g., a wired interface).

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Throughout this disclosure, the term "a logic positive state" may be referred to as a logic '1' and the term "a logic negative state" may be referred to as a logic '0'. It is to be understood that the term "a logic positive state" may include any state where a device, circuit and/or logic element is considered to be in a positive and/or high state, including when the device, circuit, and/or logic element output is a logical 1, an analog 5 volts, an analog 3.5 volts, a digital 1, or any other state which may be considered as a positive and/or high state by a device, circuit and/or logic element. Further, it is to be understood that the term "a logic negative state" may include any state where a device, circuit and/or logic element is considered to be in a negative and/or low state, including when the device, circuit, and/or logic element output is a logical 0, an analog 0 volts, a digital 0, or any other state which may be considered as a negative and/or low state by a device, circuit and/or logic element. Additionally, in some embodiments, the term "a logic positive state" may refer to a logic '0' and the term "a logic negative state" may refer to a logic '1'.

Referring now to FIG. 1, wherein a network system 100, according to various embodiments, is shown. The network system 100 may include a plurality of universal serial bus (USB) devices 102, communicatively coupled to a network access point 104. The network access point 104 may further be communicatively coupled to a network 106, from which information transmitted from the plurality of USB devices 102 may be accessed.

The plurality of USB devices 102 may include one or more personal healthcare class devices for gathering health information from a user interacting with a USB device from the plurality of USB devices 102. The plurality of USB devices 102 may include, but are not limited to, one or more blood-pressure cuffs, watches, pedometers, glucose sensors, COD meters, pulse oximeters, video/motion sensors, spirometers, or any combination thereof. In embodiments, the plurality of USB devices 102 may be wired to the network access point 104 and may be configured to transmit information obtained by the plurality of USB devices 102 in response to the information being obtained by the plurality of USB devices 102, at certain intervals, at a predetermined trigger, or any combination thereof.

The network access point 104 may include a server, a computer, a network-enabled device, or any combination thereof. In embodiments, the network access point 104 may include a healthcare device configured to securely transmit patient information to the network 106. The network access point 104 may include a personal computer health appliance, a mobile health appliance (such as a cell phone, smart phone, and/or other wireless communication device), or any combination thereof. The network access point 104 may be configured to store information received from the plurality of USB devices 102 and transmit the information to the network 106 in response to receiving a request for the information.

The network 106 may include any type of network, such as a local area network, the Internet, or any combination thereof. The network 106 may allow for access of information stored on the network access point 104 by individuals or entities associated with users of the plurality of USB devices 102 and/or the network access point 104, such as users (e.g., patients) of the plurality of USB devices 102 and/or network access point 104, healthcare providers, disease management services, relatives of the users of the plurality of USB device 102, spouses of the user of the plurality of USB devices 102, or any combination thereof.

Electrical noise may be introduced throughout the network system 100 by external equipment or electrical phenomena. This electrical noise may cause false readings and/or errors in the network system 100. In embodiments, the network system 100, and in particular the plurality of USB devices 102, may be designed to withstand a particular amount of electrical noise without interruption to or loss of information sent from the plurality of USB devices 102.

In some healthcare embodiments, the network system 100 may be designed to withstand an Electrical Fast Transient (EFT) voltage of plus and/or minus 1.5 kilovolts or more. The EFT voltage may translate across the transmission wires connecting the plurality of USB devices 102 and the network access point 104, where the USB devices 102 and/or the network access point 104 may experience an electrical transient voltage of greater than one volt. Often, the plurality of USB devices 102 may be designed to withstand a common mode disturbance voltage in the range from −50 millivolts to 500 millivolts. Any voltages experienced by the plurality of USB devices 102 of greater or less than this range may result in the plurality of USB devices 102 and/or the network access point 104 entering an error mode, receiving and/or transmitting corrupted data, or any combination thereof.

Figure 2:
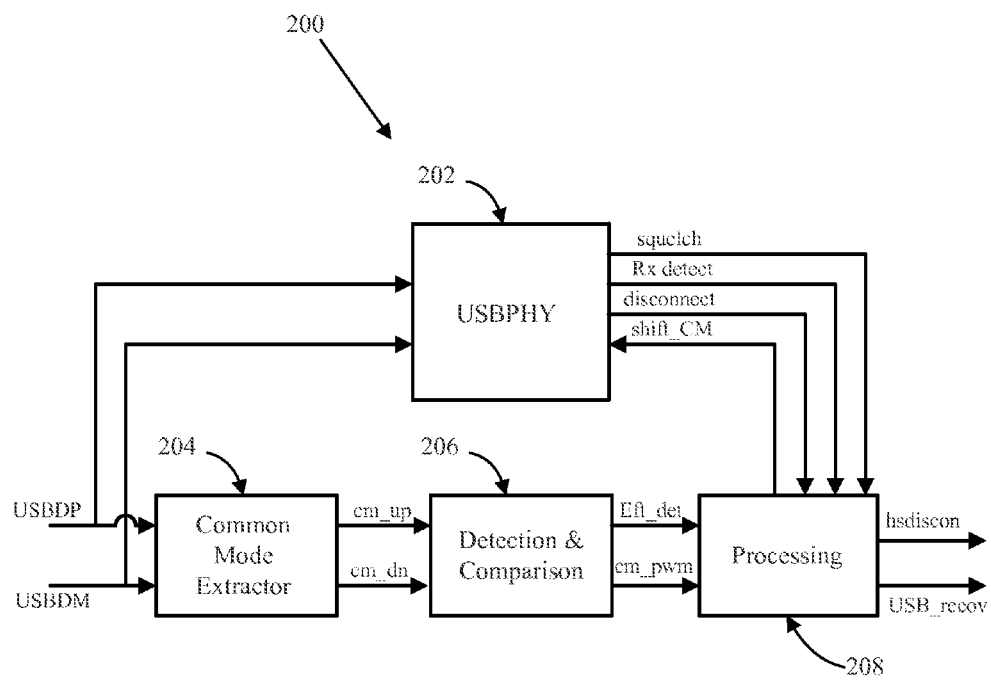
FIG. 2 illustrates an example common mode compensation circuit, according to various embodiments.

Referring now to FIG. 2, wherein a common mode compensation circuit 200, according to various embodiments, is shown. The common mode compensation circuit 200 may include common mode extractor circuitry 204, detection and comparison circuitry 206, processing circuitry 208, or any combination thereof. The common mode compensation circuit 200 may be coupled to a physical layer of a USB device (USBPHY) 202, a processor, USB communication circuitry, or any combination thereof. The common mode compensation circuit 200 may be included in various components of the network system 100 of FIG. 1, including the plurality of USB devices 102, the network access point 104, or any combination thereof.

The common mode extractor circuitry 204 may receive a USB input signal being transmitted on USB data plus (USBDP) and USB data minus (USBDM) lines. The common mode extractor circuitry 204 may extract a common mode voltage signal from the USB input signal. In embodiments where the USB input signal is experiencing a common mode noise disturbance, the common mode voltage signal may include positive and/or negative peaks of greater than positive one volt or less than negative one volt.

Based on the extracted common mode voltage signal, the common mode extractor circuitry 204 may determine that the common mode voltage is greater than a predetermined maximum common mode voltage and/or less than a predetermined minimum common mode voltage at certain points in time. The predetermined maximum common mode voltage may be associated with a maximum operational voltage or a maximum rated voltage of a USB device and the predetermined minimum common mode voltage may be associated with a minimum operational voltage or a minimum rated voltage of the USB device. For example, the predetermined maximum common mode voltage may be selected to be 75 percent of the maximum operational voltage of the USB device. In embodiments, the predetermined maximum common mode voltage may be selected to be 500 millivolts, which is often the maximum rated voltage of a USB device, and the predetermined minimum common mode voltage may be selected to be −50 millivolts, which is often the minimum rated voltage of a USB device.

The common mode extractor circuitry 204 may output a common mode up (cm_up) signal indicating that the common mode extractor circuitry 204 has determined that the common mode voltage is greater than the predetermined maximum common mode voltage. Additionally, the common mode extractor circuitry 204 may output a common mode down (cm_dn) signal indicating that the common mode extractor circuitry 204 has determined that the voltage is less than the predetermined minimum common mode voltage. In some embodiments, the cm_up signal may be in a logical positive state (such as a 'logical 1') when the common mode voltage is greater than the predetermined maximum common mode voltage and a logical negative state (such as a 'logical 0') when the common mode voltage is less than the predetermined maximum common mode voltage. Likewise, the cm_dn signal may be in a logical positive state when the common mode voltage is less than the predetermined minimum common mode voltage and output a logical negative state when the common mode voltage is greater than the predetermined minimum common mode voltage.

The cm_up signal and the cm_dn signal may be input into the detection and comparison circuitry 206. The detection and comparison circuitry 206 may identify a common mode noise disturbance based on the cm_up signal and/or the cm_dn signal. In embodiments, the common mode noise disturbance may be an EFT disturbance.

Identifying the common mode noise disturbance may include identifying a logical positive state of the cm_up signal and a corresponding logical positive state of the cm_dn signal. The logical positive state of the cm_up signal may be associated with a positive peak voltage associated with a common mode noise disturbance and the logical positive state of the cm_dn signal may be associated with a negative peak voltage associated with the same common mode noise disturbance. Often, a common mode noise disturbance may include a positive peak voltage and a corresponding negative peak voltage, which the common mode compensation circuit 200 may utilize for determining a common mode noise disturbance occurred. In particular, the common mode compensation circuit may determine that a common mode noise disturbance occurred in response to identifying a logical positive state of the cm_up signal, corresponding to a positive peak voltage, and a corresponding logical positive state of the cm_dn signal, corresponding to a negative peak voltage.

In situations where the compensation circuit 200 identifies a single logical positive state of the cm_up signal without a corresponding logical positive on the cm_dn signal, a single logical positive state of the cm_dn signal without a corresponding logical positive state of the cm_up signal, two logical positive states of the cm_up signal without an intervening logical positive state of the cm_dn signal, and/or two logical positive states of the cm_dn signal without an intervening logical positive state of the cm_up signal, the compensation circuit 200 may determine that a common mode noise disturbance has not occurred.

Based on the identification of the common mode noise disturbance, the detection and comparison circuitry 206 may output an EFT detection signal (Eft_det) and a common mode pulse width modulation (PWM) signal (cm_pwm).

The EFT detection signal may indicate that the detection and comparison circuitry 206 has determined when a common mode noise disturbance has occurred. In particular, the EFT detection signal may transition or remain in a logical positive state in response to identifying the corresponding negative peak voltage associated with the common mode noise disturbance. The EFT detection signal may remain in the logical positive state until the common mode noise disturbance has subsided, for a period of time after the EFT detection has transitioned to the logical positive state, for a period of time after the common noise disturbance has subsided, or any combination thereof. Further, the time that the EFT detection signal remains in a logical positive state may be extended in response to the detection and comparison circuitry 206 identifying additional common mode noise disturbances. After the common mode noise disturbance has subsided or the period of time has expired, depending on the embodiment, the EFT detection signal may transition to a logical negative state.

The PWM signal may indicate a period for which a common mode noise disturbance is occurring. The PWM signal may transition to a logical positive state in response to the cm_up signal transitioning to a logical positive state associated with a positive peak voltage of a common mode noise disturbance and may transition to a logical negative state in response to the cm_dn signal transitioning to a logical negative state associated with an end of a corresponding negative peak voltage of the common mode noise disturbance. In other embodiments, the PWM signal may transition to a logical positive state in response to the cm_up signal transitioning to a logical positive state associated with a positive peak voltage of a common mode noise disturbance and may transition to a logical negative state in response to the cm_dn signal transitioning into a logical positive state associated with a beginning of the corresponding negative peak voltage of the common mode noise disturbance. The period for which the PWM signal remains in a logical positive state may be referred to as a window of time in which the common mode noise disturbance occurred.

The detection and comparison circuitry 206 may pass the Eft_det signal and the cm_pwm signal to the processing circuitry 208. The processing circuitry 208 may adjust and/or shift the common mode voltage of the USBPHY, may request that the USBPHY adjust and/or shift the common mode voltage of the USBPHY, or any combination thereof. The adjusting and/or shifting, the request, or any combination thereof, may be initiated or generated by the processing circuitry 208 based on the EFT detection signal, the cm_pwn signal, or any combination thereof.

The processing circuitry 208 may determine whether the common mode voltage of the USBPHY should be adjusted and/or shifted based on the Eft_det and cm_pwm signals and for what period of time the adjusting and shifting should occur. The Eft_det signal may include information regarding the common mode noise disturbance detected by the detection and comparison circuitry 206. The information may include the extracted common mode voltage signal, an indication or indications that the current common mode voltage is greater than the predetermined maximum common mode voltage and/or less than the predetermined minimum common mode voltage, a portion of the current common mode voltage signal is greater than the predetermined maximum common mode voltage or less than the predetermined minimum common mode voltage, or any combination thereof.

The cm_pwm signal may indicate a period for which the common mode noise disturbance is occurring. The processing circuitry 208 may utilize the period indicated by the cm_pwm signal in determining a period of time for which the adjusting and/or shifting should be performed. In embodiments, the processing circuitry 208 may determine whether the common mode voltage should be adjusted and/or shifted for the period indicated by the cm_pwm signal and may forgo the determination outside of the period, thereby limiting the processing performed when the USB input signal is not experiencing a common mode noise disturbance.

In response to the processing circuitry 208 determining that common mode voltage should be adjusted and/or shifted, the processing circuitry 208 may output a shift signal (shift_CM) to the USBPHY 202 regarding the common mode voltage. The shift signal may include the adjusted and/or shifted common mode voltage, a request for the USBPHY 202 to shift the common mode voltage, or any combination thereof. The adjusted and/or shifted common mode voltage on the shift signal may be adjusted to within an acceptable operation voltage range of the USB device. For example, the common mode voltage may be shifted to within the maximum rated voltage and the minimum rated voltage of the USB device.

In embodiments, the shift_CM signal may include two signals, one a positive shift signal and one a negative shift signal, that indicate that the USBPHY 202 should shift the common mode voltage. For example, the positive shift signal of the shift_CM signal may be held in a logical positive state to indicate that the USBPHY 202 should decrease the common mode voltage, while the negative shift signal of the shift_CM signal may be held in a logical positive state to indicate that the USBPHY 202 should increase the common mode voltage.

Further, the processing circuitry 208 may receive error signals from the USBPHY 202 and selectively mask the error signals based on the identification of a common mode noise disturbance. The error signals received from the USBPHY 202 may include a squelch signal, a Rx detect signal, a disconnect signal, or any combination thereof. In response to the detection and comparison circuitry identifying a common mode noise disturbance, the processing circuitry 208 may mask the error signals by replacing the error signals with signals indicating that there is not an error.

The processing circuitry 208 may output a replacement disconnect signal (hsdiscon), a USB recovery signal (USB_recov), or any combination thereof. The hsdiscon signal may indicate whether the USB device should enter an error state, such as a disconnect state, a suspend state and/or reset state. The processing device 208 may determine whether the hsdiscon signal should indicate that the USB device should enter an error state based on the squelch line, the Rx_detect line, the disconnect line, the EFT_det line, or any combination thereof.

In embodiments, the processing circuitry 208 may mask error signals, including the squelch signal, the Rx_detect signal, the disconnect signal, or any combination thereof, in response to the Eft_det signal being in a logical positive state and, accordingly, suppress the indication (e.g., by the hsdiscon signal) that the USB device should enter an error state. When the Eft_det signal is in a logical negative state, the hsdiscon signal may indicate that the USB device should enter an error state in response to determining that the squelch signal, the Rx_detect signal, the disconnect signal, or any combination thereof is indicating that the USB device should enter the error state.

The Eft_det signal may remain in a logical positive state for at least a duration of one common mode noise disturbance. In embodiments, the Eft_det signal may further remain in the logical positive state for a certain time period after the duration of the common mode noise disturbance. Further, the Eft_det signal may remain in the logical positive state for a duration of multiple common mode noise disturbances occurring within a certain time of each other or at a certain frequency. The processing circuitry 208 may mask the error signals for the entire duration that the Eft_det signal is in the logical positive state.

The USB_recov signal may provide an indication that the USB device should recover stored information from a time period prior to the common mode noise disturbance or prior to a point in time where information was lost or corrupted due to the common mode noise disturbance. The USB_recov signal may provide the indication to recover stored information in response to determining that a common mode noise disturbance continued for greater than a predetermined period of time, that a certain number of common mode noise disturbances occurred within a period of time, a frequency of common node noise disturbances is greater than a predetermined frequency, or any combination thereof. In embodiments, the USB_recov signal may indicate that recovery of the stored information should occur in response to determining that two or more common mode noise disturbances occurred within a certain period of time. Further, in response to receiving the signal indicating that recovery of the stored information should occur, the USB device may transition to an error state, such as a suspend state or a reset state.

Figure 3:
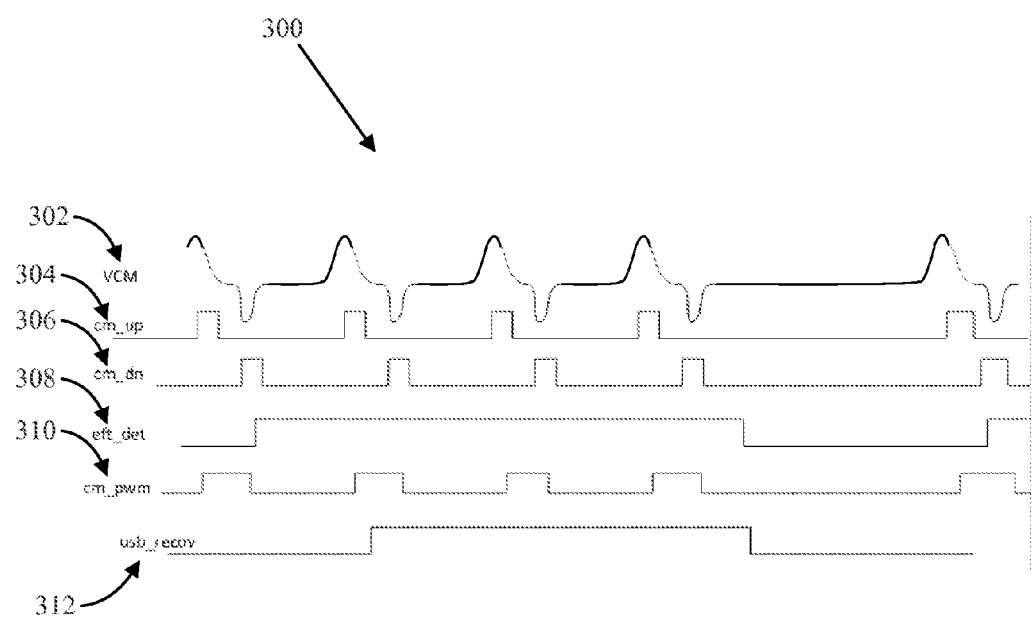
FIG. 3 illustrates an example timing diagram of various signals of a common mode compensation circuit, according to various embodiments.

Referring now to FIG. 3, wherein a timing diagram 300 of various signals of a common mode compensation circuit, according to various embodiments, is shown. The timing diagram includes a common mode voltage (VCM) signal 302, which may include the common mode voltage extracted by the common mode extractor circuitry 204 of FIG. 2. As shown, the VCM signal 302 may include a plurality of positive voltage peaks and a plurality of negative voltage peaks. A positive voltage peak and a corresponding, subsequent negative voltage peak may be associated with a common mode noise disturbance.

The common mode up (cm_up) signal 304, which may correspond to the cm_up signal output by the common mode extractor circuitry 204 of FIG. 2, may indicate when a voltage of the VCM signal 302 is greater than a predetermined maximum common mode voltage. The cm_up signal 304 may be in a logical positive state when the voltage of the VCM signal 302 is above the predetermined maximum common mode voltage. In some embodiments, the predetermined maximum common mode voltage may be a maximum rated voltage of a USB device, such as 500 millivolts. The cm_up signal 304 may remain in the logical positive state until the voltage of the VCM signal 302 drops below the predetermined maximum common mode voltage, at which point the cm_up signal 304 transitions into a logical negative state. In embodiments, the cm_up signal 304 may transition to a logical positive state in response to a positive peak voltage of the VCM signal 302 and transition to a logical negative state in response to the VCM signal 302 returning to a neutral common mode voltage, such as zero volts.

The common mode down (cm_dn) signal 306, which may correspond to the cm_dn signal output by the common mode extractor circuitry 204 of FIG. 2, may indicate when a voltage of the VCM signal 302 is less than a predetermined minimum common mode voltage. The cm_dn signal 306 may be in a logical positive state when the voltage of the VCM signal 302 is below the predetermined minimum common mode voltage. In embodiments, the predetermined minimum common mode voltage may be a minimum rated voltage of a USB device, such as −50 millivolts. The cm_dn signal 306 may remain in the logical positive state until the voltage of the VCM signal 302 rises above the predetermined minimum common mode voltage, at which point the cm_dn signal 306 transitions into a logical negative state. In embodiments, the cm_dn signal 306 may be set to transition to a logical positive state in response to a negative peak voltage of the VCM signal 302 and transition to a logical negative state in response to the VCM signal 302 returning to a neutral common mode voltage, such as zero volts.

The EFT detection (eft_det) signal 308, which may correspond to the Eft_det signal output by the detection and comparison circuitry 206 of FIG. 2, may transition to a logical positive state when a common mode noise disturbance has been detected. In particular, the eft_det signal 308 may transition into a logical positive state in response to the cm_dn signal 306 transitioning into a logical positive state, where the transition into the logical positive state of the cm_dn signal 306 is associated with a negative peak voltage of a common mode noise disturbance occurring subsequent to a positive peak voltage of the same common mode noise disturbance.

The eft_det signal 308 may remain in a logical positive state for a set period of time after the transition of the cm_dn signal 306 that caused the eft_det signal 308 to transition to the logical positive state. In some embodiments, the period of time may be increased in response to further common mode noise disturbances being detected. In embodiments, the period of time may be reset in response to the detection of further cm_dn signal 306 transitions to the logical positive state associated with a common mode noise disturbance. The period of time may then run from the most recent transition to the logical positive state of the cm_dn signal 306.

The common mode PWM (cm_pwm) signal 310, which may correspond to the cm_pwm signal output by the detection and comparison circuitry 206 of FIG. 2, may transition to a logical positive state in response to detection that a voltage level of the VCM signal 302 is above a predetermined maximum common mode voltage. The detection of the voltage level of the VCM signal 302 being above the predetermined maximum common mode voltage may be indicated by the cm_up signal 304 being in a logical positive state. The cm_pwm signal 310 may transition to a logical negative state in response to the cm_dn signal 306 transitioning to a logical negative state and thereby indicating a termination of a common mode noise disturbance.

The cm_pwm signal 310 may remain in a logical positive state for a duration of a common mode noise disturbance, as indicated by a transition to a logical positive state of the cm_up signal 304 and a subsequent transition to a logical negative state of the cm_dn signal 306. The cm_pwm signal 310 may be utilized by processing circuitry, such as processing circuitry 208 of FIG. 2, for determining an amount of time that the common mode voltage should be adjusted and/or shifted.

The USB recovery (usb_recov) signal 312, which may correspond to the USB_recov signal output by the processing circuitry 208 of FIG. 2, may provide an indication that the USB device should recover information associated with a state prior to common mode noise disturbance or prior to a time period where the USB input signal is corrupted and/or lost due to one or more common mode noise disturbances. The usb_recov signal 312 may transition to a logical positive state in response to detection of a certain number of common mode noise disturbances occurring within a time period, such as two common mode noise disturbances occurring within 200 micro seconds of each other. In embodiments, the usb_recov signal 312 may transition to a logical positive state in response to the cm_pwm signal 310 transitioning to a logical positive state while the eft_det signal 308 is in a logical positive state.

The usb_recov signal 312 may remain in a logical positive state until the eft_det signal 308 transitions to a logical negative state, at which point the usb_recov signal 312 transitions to a logical negative state. Accordingly, the usb_recov signal 312 may continue to indicate that the USB device should recover information prior to the common mode disturbance or when the USB input signal is corrupted and/or lost due to one or more common mode noise disturbances while the identified common mode noise disturbances occur within a certain time period of each other or at greater than a certain frequency.

Figure 4:
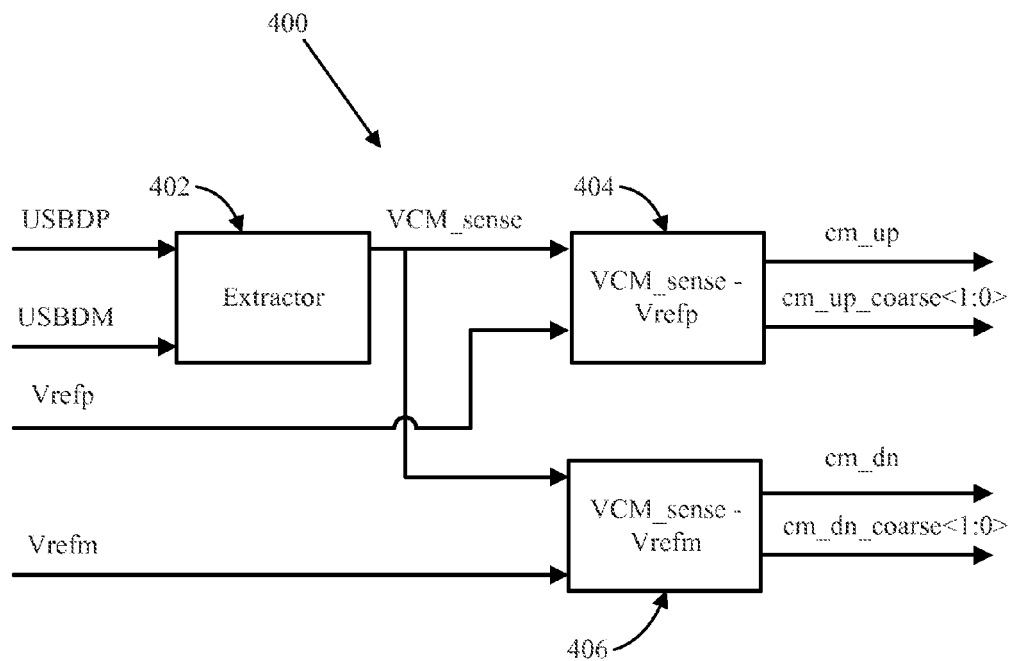
FIG. 4 illustrates example common mode extractor circuitry of a common mode compensation circuit, according to various embodiments.

Referring now to FIG. 4, wherein common mode extractor circuitry 400 of a common mode compensation circuit, according to various embodiments, is shown. The common mode extractor 204 of FIG. 2 may include the common mode extractor circuitry 400.

The common mode extractor circuitry 400 may include extractor circuitry 402 that receives a USB data plus input signal (USBDP) and a USB data minus input signal (USBDM) are connected. The extractor circuitry 402 may include circuitry to extract a common mode voltage signal from the USBDP and USBDM signals. The extractor circuitry 402 may output the extracted common mode signal (VCM_sense).

The common mode extractor circuitry 400 may further include positive reference comparator circuitry 404 and negative reference comparator circuitry 406. The positive reference comparator circuitry 404 and the negative reference comparator circuitry 406 may each comprise any circuitry for comparing two voltages, such as a comparator.

The positive reference comparator circuitry 404 may receive as input the extracted common mode signal VCM_sense from the extractor circuitry 402 and a positive reference voltage (Vrefp). The positive reference comparator circuitry 404 may compare a portion of the extracted common mode signal with the Vrefp and determine whether the portion is greater than the Vrefp, an amount that the portion is greater than the Vrefp, or any combination thereof.

The positive reference circuitry 404 may output a common up signal (cm_up), a coarse common up signal (cm_up_coarse<1:0>), or any combination thereof. The common up signal may be in a logical positive state when the discrete portion of the extracted common mode signal measures a voltage greater than the Vrefp and may be in a logical negative state when the discrete portion measures a voltage less than the Vrefp.

The coarse common up signal may be a discrete output from the positive reference comparator circuitry 404, which compares the extracted common mode signal VCM_sense with the positive reference voltage Vrefp. The coarse common up signal may be a two-bit output of the positive reference comparator circuitry 404. A first bit of the two-bit output may be in a logical positive state and a second bit of the two-bit output signal may be in a logical negative state when the extracted common mode signal VCM_sense is greater than the positive reference voltage Vrefp. The second bit may be in a logical positive state and the first bit may be in a logical negative state when the extracted common mode signal VCM_sense is less than the positive reference voltage Vrefp. The first bit and the second bit may be either both in a logical positive state or both in a logical negative state when the extracted common mode signal VCM_sense is equal to, or substantially equal to, the positive reference voltage Vrefp.

In some embodiments, the positive reference comparator circuitry 404 may include a tolerance value for the comparison of the extracted common mode signal VCM_sense with the positive reference voltage Vrefp. In these embodiments, the output of the positive reference comparator circuitry 404 may indicate that the extracted common mode signal VCM_sense and the positive reference voltage Vrefp are substantially equal (i.e. the first bit and the second bit are both either in a logical positive state or a logical negative state) when the extracted common mode voltage VCM_sense is within the tolerance value of the positive reference voltage Vrefp. The output of the positive reference comparator circuitry 404 may indicate that the extracted common mode signal VCM_sense is greater than (i.e. the first bit is in a logical positive state and the second bit is in a logical negative state) or that the extracted common mode signal VCM_sense is less than (i.e. the second bit is in a logical positive state and the first bit is in a logical negative state) the positive reference voltage Vrefp when the difference between the common mode signal VCM_sense and the positive reference voltage Vrefp is greater than the tolerance value.

The negative reference comparator circuitry 406 may receive as input the extracted common mode signal VCM_sense from the extractor circuitry 402 and a negative reference voltage (Vrefm). The negative reference comparator circuitry 406 may compare a discrete portion of the extracted common mode signal with the Vrefm and determine whether the discrete portion is less than the Vrefm, an amount that the discrete portion is less than the Vrefm, or any combination thereof.

The negative reference comparator circuitry 406 may output a common down signal (cm_dn), a coarse common down signal (cm_dn_coarse<1:0>), or any combination thereof. The common down signal may be in a logical positive state when the discrete portion of the extracted common mode signal has a voltage less than the Vrefm and may be in a logical negative state when the discrete portion measures a voltage greater than the Vrefm.

The coarse common down signal may be a discrete output from the negative reference comparator circuitry 406, which compares the extracted common mode signal VCM_sense with the negative reference voltage Vrefm. The coarse common down signal may be a two-bit output of the negative reference comparator circuitry 406. A first bit of the two-bit output may be in a logical positive state and a second bit of the two-bit output signal may be in a logical negative state when the extracted common mode signal VCM_sense is greater than the negative reference voltage Vrefm. The second bit may be in a logical positive state and the first bit may be in a logical negative state when the extracted common mode signal VCM_sense is less than the negative reference voltage Vrefm. The first bit and the second bit may be either both in a logical positive state or both in a logical negative state when the extracted common mode signal VCM_sense is equal to, or substantially equal to, the negative reference voltage Vrefm.

In some embodiments, the negative reference comparator circuitry 406 may include a tolerance value for the comparison of the extracted common mode signal VCM_sense with the negative reference voltage Vrefm. In these embodiments, the output of the negative reference comparator circuitry 406 may indicate that the extracted common mode signal VCM_sense and the negative reference voltage Vrefm are substantially equal (i.e. the first bit and the second bit are both either in a logical positive state or a logical negative state) when the extracted common mode voltage VCM_sense is within the tolerance value of the negative reference voltage Vrefm. The output of the negative reference comparator circuitry 406 may indicate that the extracted common mode signal VCM_sense is greater than (i.e. the first bit is in a logical positive state and the second bit is in a logical negative state) or that the extracted common mode signal VCM_sense is less than (i.e. the second bit is in a logical positive state and the first bit is in a logical negative state) the negative reference voltage Vrefm when the difference between the common mode signal VCM_sense and the negative reference voltage Vrefm is greater than the tolerance value.

In embodiments, the Vrefp may be associated with a maximum operational voltage of the USB device and the Vrefm may be associated with a minimum operational voltage of the USB device. For example, the Vrefp may be set to a percentage, such as 75 percent, of the maximum operational voltage and the Vrefm may be to set to a percentage, such as 75 percent, of the minimum operational voltage. In embodiments, Vrefp and the Vrefm may be set based on a maximum rating voltage of the USB device and a minimum rating voltage of the USB device, respectively. Further, in some embodiments, the Vrefp and Vrefm may be configured by a manufacturer of the common mode compensation circuit, an end user of the common mode compensation circuit, a technician performing calibration of the common mode compensation circuit, or any combination thereof.

Figure 5:
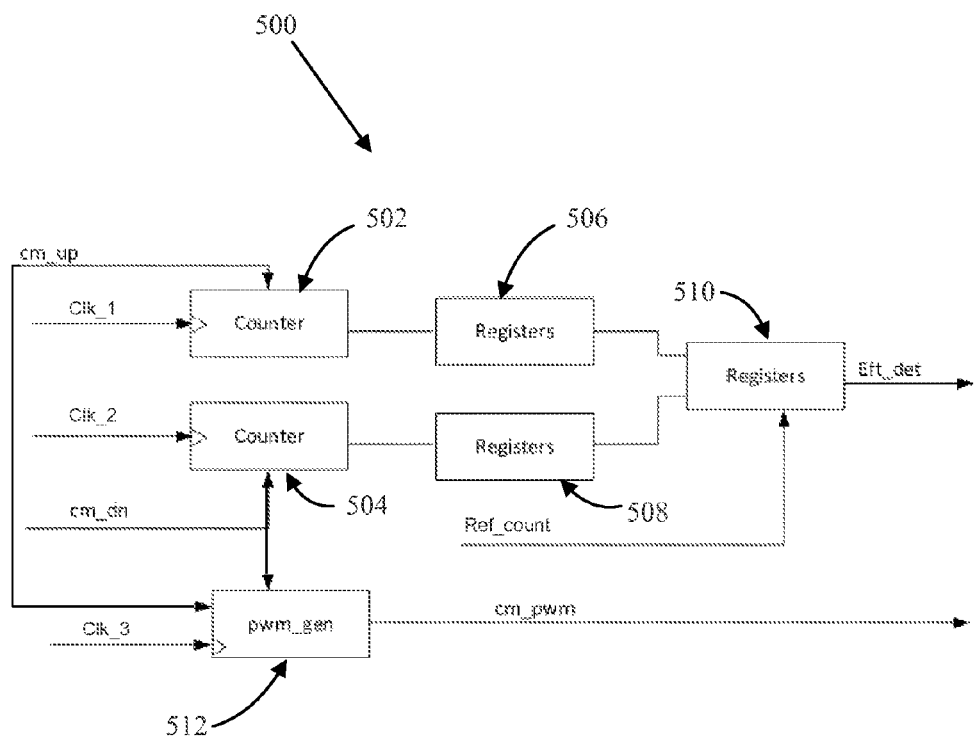
FIG. 5 illustrates example detection and comparison circuitry of a common mode compensation circuit, according to various embodiments.

Referring now to FIG. 5, wherein detection and comparison circuitry 500 of a common mode compensation circuit, according to various embodiments, is shown. The detection and comparison circuitry 500 may include one or more counters, such as counter 502 and counter 504, one or more registers, such as registers 506, registers 508, and registers 510, pulse width modulation generator logic 512, or any combination thereof.

The detection and comparison circuitry 500 may receive cm_up and cm_dn signals from the common mode extractor circuitry 400 of FIG. 4. The cm_up signal may be connected to the counter 502 of the detection and comparison circuitry 500. The counter 502 may count a number of times the cm_up signal transitions to a logical positive state. The count of the counter 502 may be incremented each time a positive edge is sensed on the cm_up signal.

Further, the counter 502 may receive a clock signal (Clk_1). In some embodiments, the clock signal Clk_1 may include a 60 megahertz square wave signal, however it is to be understood that the clock signal may be any frequency or have any shape, including a pulse wave signal, a sinusoidal wave signal, a triangle wave signal, or any combination thereof. The counter 502 may reset the count of cm_up signal transitions to a logical positive state in response to receiving a certain amount of transitions (e.g., to a logical positive state) of Clk_1, such as resetting the count in response to receiving a single transition to the logical positive state on Clk_1.

The cm_dn signal may be connected to the counter 504 of the detection and comparison circuitry 500. The counter 504 may count a number of times a signal propagating on the cm_dn signal transitions (e.g., to a logical positive state). The count of the counter 504 may be incremented each time a positive edge is sensed on the cm_dn signal.

Further, the counter 504 may receive a clock signal (Clk_2). In some embodiments, the clock signal may include a 60 megahertz square wave signal, however it is to be understood that the clock signal may be any frequency or have any shape, including a pulse wave signal, a sinusoidal wave signal, a triangle wave signal, or any combination thereof. The counter 504 may reset the count of cm_dn signal transitions to a logical positive state in response to receiving a certain number of transitions (e.g., to a logical positive state) on Clk_2, such as resetting the count in response to receiving a single transition to the logical positive state on Clk_2.

The outputs of counter 502 and counter 504 may be output to registers 506 and registers 508, respectively. The outputs of registers 506 and registers 508 may be output to registers 510. Additionally, registers 510 may receive a reference counter line (Ref_count).

In response to detecting a transition to a logical positive state of a signal received from registers 506 and detecting a corresponding transition to a logical positive state of a signal received from registers 508, registers 510 may transition to a logical positive state. When in the logical positive state, registers 510 may output an EFT detection signal (Eft_det) with a logical positive state and when in a logical negative state, registers 510 may output the Eft_det signal with a logical negative state. The transition to the logical positive state received from registers 506 and the corresponding transition to the logical positive state received from registers 508 may indicate that a common mode noise disturbance occurred. Registers 510 may lock in a logical positive state after detecting the transition and the corresponding transition, regardless of future inputs from registers 506 and/or registers 508.

The counter value Ref_count begin counting in response to the detection of the transition to the logical positive state received from registers 506 and the detection of the corresponding transition to the logical positive state received from registers 508. The Ref_count value may reset in response to detecting a subsequent transition to a logical positive state received from registers 506 and a subsequent, corresponding transition to a logical positive state received from registers 508. Accordingly, the Ref_count value may begin counting from a most recently detected common mode noise disturbance and continue counting until the Ref_count value reaches a maximum count value or until a subsequent common mode noise disturbance is detected, whichever occurs first.

In response to the Ref_count reaching the maximum count value, registers 510 that are locked in a logical positive state may be reset to a logical negative state. In some embodiments, the Ref_count value may have an initial value of 0 and a maximum value of 3. Registers 510 may then begin monitoring the inputs received from registers 506 and registers 508 again for a transition to a logical positive state from registers 506 and a corresponding transition to a logical positive state from registers 508.

In other embodiments, the Ref_count may include a signal that periodically pulses or transitions to a logical positive state at a given frequency. In response to registers 510 transitioning to a logical positive state, registers 510 may begin monitoring the Ref_count for transitions to a logical positive state on the Ref_count. Registers 510 may transition to a logical negative state in response to identifying a certain number of transitions to a logical positive state on the Ref_count. Registers 510 may increase the certain number of transitions or reset the count of the number of transitions on the Ref_count in response to receiving a subsequent transition to a logical positive state from registers 506 and receiving a subsequent, corresponding transition to a logical positive state from registers 508.

The pulse width modulation generator logic 512 may receive the cm_up and the cm_dn signals as inputs and output a common mode PWM signal (cm_pwm). The pulse width modulation generator logic 512 may transition the common mode PWM signal to a logic positive state in response to detecting an edge of a transition to a logic positive state on the cm_up signal. Further, the pulse width modulation generator logic 512 may transition the common mode PWM signal to a logic negative state in response to detecting an edge of a transition to a logic negative state on the cm_dn signal. Accordingly, the cm_pwm signal may be in a logic positive state for a duration of each common mode noise disturbance and may remain in a logic negative state for a period during which a common mode noise disturbance is not occurring.

In embodiments, the pulse width modulation generator logic 512 may further receive a clock signal Clk_3 as an input. In some embodiments, the clock signal Clk_3 may include a 60 megahertz square wave, however it is to be understood that the clock signal Clk_3 may be any suitable frequency or have any suitable shape, including a pulse wave signal, a sinusoidal wave signal, a triangle wave signal, or any combination thereof. The pulse width modulation generator logic 512 may transition the common mode PWM signal in response to detecting a transition to a logic positive state in the Clk_3 signal and based on the cm_up and cm_dn signals.

Figure 6:
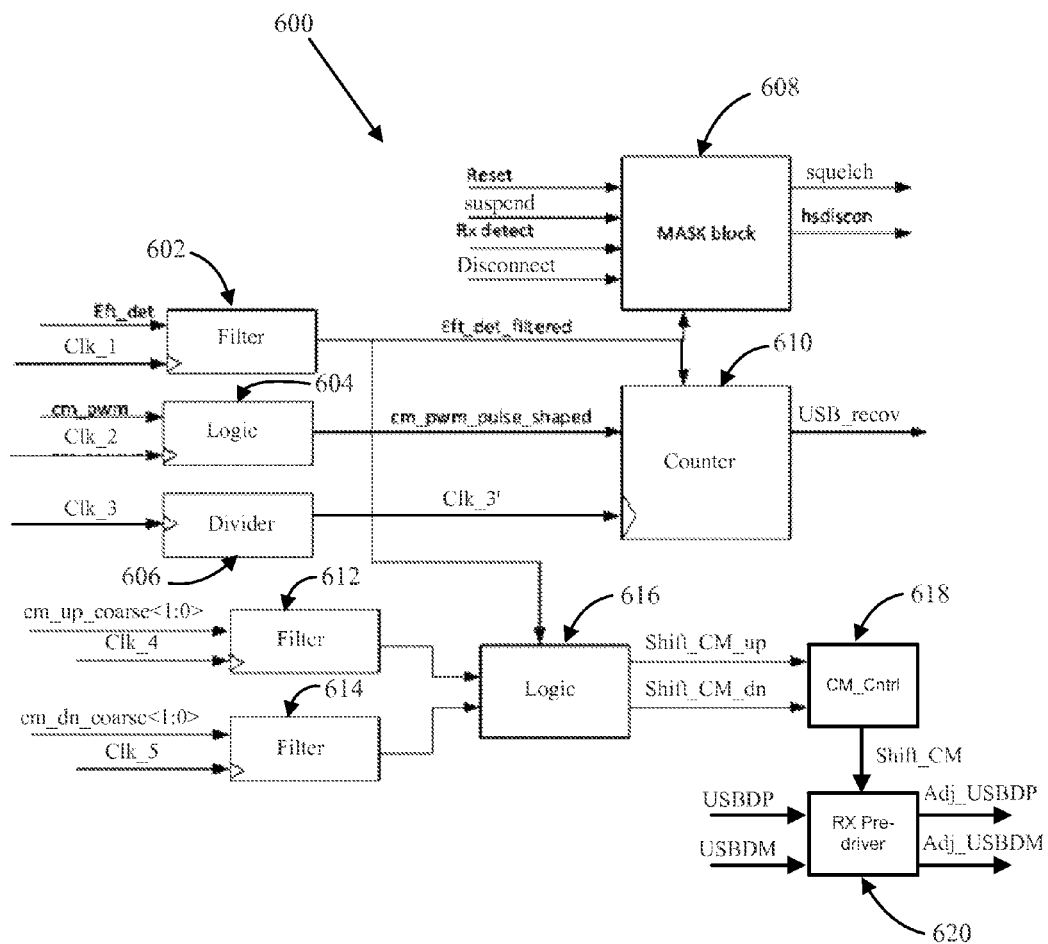
FIG. 6 illustrates example processing circuitry of a common mode compensation circuit, according to various embodiments.

Referring now to FIG. 6, wherein processing circuitry 600 of a common mode compensation circuit, according to various embodiments, is shown. The processing circuitry 600 may include one or more filters, such as filter 602, filter 612, and filter 614, one or more logic circuits, such as logic circuit 604 and logic circuit 616, a clock divider 606, a counter 610, a MASK block 608, a common mode controller 618, or any combination thereof.

The one or more filters may filter various signals received by the processing circuitry 600. For example, the filter 602 may filter the EFT detection signal Eft_det received from the detection and comparison circuitry 500 of FIG. 5, the filter 612 may filter a common up coarse signal cm_up_coarse received from the common mode extractor circuitry 400 of FIG. 4, and the filter 614 may filter a common down coarse signal received on the cm_dn_coarse line from the common mode extractor portion 400 of FIG. 4.

The filter 612 and the filter 614 may operate to filter high frequency noise (e.g., white noise) from the common up_coarse signal and the common down coarse signal, respectively. In one embodiment, the high frequency noise may be filtered by averaging a signal value over a specified number of samples. The one or more filters may output a filtered version of the signal received by each of the filters. In embodiments, the one or more filters may include moving average filters, multiple-pass moving average filters, Gaussian filters, Blackman filters, or any combination thereof.

The logic circuit 604 may receive a common mode PWM signal cm_pwm from the detection and comparison circuitry 500 of FIG. 5. The logic circuit 604 may include a pulse-shaped logic circuit to receive the common mode PWM signal and transform the common mode PWM signal into a pulse shaped signal, where the logic circuit 604 outputs a pulse corresponding to each positive edge of the cm_cwm signal received by the logic circuit 604. The transformed common mode PWM signal may be output by the logic circuit 604 as the PWM pulse shaped signal (cm_pwm_pulse_shaped).

The counter 610 may receive the transformed common mode PWM signal as an input, along with the filtered EFT detection signal Eft_det_filtered and a modified clock signal Clk_3'. The modified clock signal Clk_3' may be produced by a clock divider 606 based on the Clk_3 signal. For example, the clock divider 606 may receive the clock signal Clk_3 and may modify the received clock signal Clk_3 by dividing the frequency of the clock signal Clk_3 to generate the modified clock signal Clk_3'. In some embodiments, the clock signal Clk_3 may be about 32 kilohertz and the clock divider 606 may divide the frequency of the clock signal by approximately six to generate a modified clock signal of about five kilohertz. The modified clock signal Clk_3' may be output by the clock divider 606.

The counter 610 may count a number of common mode noise disturbances that occur at the input of the USB device, as experienced by the USBDP and USBDM signals illustrated in FIG. 4. The counter 610 may increment a counter value in response to detecting a transition to a logic positive state in the cm_pwm_pulse_shaped signal.

The counter 610 may output a recovery indicator signal (cnt_usb_recovery). The recovery indicator signal may initiate in a logic negative state. In response to the counter 610 reaching a certain count and the filtered EFT detection signal on the Eft_det_filtered line being in a logic positive state, the recovery indicator signal may transition to a logic positive state. The recovery indicator signal may remain in a logic positive state while the filtered EFT detection signal input to the counter 610 remains in a logic positive state. The recovery indicator signal may transition from the logic positive state to the logic negative state in response to detecting that the filtered EFT detection signal transitioned to a logic negative state.

In embodiments, the count of the counter 610 may be reset in response to detecting a transition to a logic positive state on the Clk_3' signal. Accordingly, for the counter to reach the certain count, the common mode noise disturbances would occur within a time period associated with the Clk_3' signal, at a certain frequency associated with the Clk_3' signal, or any combination thereof. Therefore, the counter 610 may transition the USB recovery signal to a logic positive state based on determining that the common mode disturbances, as indicated by the signal on the cm_pwm_pulse_shaped line, occurred within a certain period of time or at a certain frequency, and that the filtered EFT detection signal is in a logic positive state.

The MASK block 608 may mask error signals received from a USB device physical layer, such as USBPHY 202 of FIG. 2, with signals indicating that there is not an error. The MASK block 608 may receive error signals Reset, suspend, Rx_detect, and disconnect from the USB device physical layer as inputs. The MASK block 608 may further receive the filtered EFT detection signal Eft_det_filtered as an input.

The MASK block 608 may output error signals squelch and hsdiscon. The error signals output by the MASK block 608 may be based on the error signals received from the USB device physical layer, the filtered EFT detection signal, or any combination thereof. The error signals output by the MASK block 608 may be transmitted to the USB device, indicating that the USB device should transition to and remain in an error state until the error signals output by the MASK block 608 are cleared (thereby indicating that no error is occurring).

When the filtered EFT detection signal is in a logic negative state, the MASK block 608 may monitor the error signals received from the USB device physical layer and may determine if any of the error signals received from the USB device physical layer indicate an error. If the error signals received from the USB device do not indicate an error, the MASK block 608 may provide and/or maintain the error signals output by the MASK block 608 in a state that indicates that there is no error. In response to detecting one or more of the error signals received from the USB device indicate an error, the MASK block 608 may transition a corresponding error signal or signals output by the MASK block 608 to a state indicating that there is an error. The corresponding error signal or signals may remain in the state indicating that there is an error until the error signals received from the USB device physical layer indicate that there is no longer an error.

When the filtered EFT detection signal is in a logic positive state, the MASK block 608 may mask the error signals received from the USB device physical layer. The MASK block 608 may maintain the error signals output by the MASK block 608 in a state indicating that no error is occurring, regardless of the error signals received from the USB device physical layer. The MASK block 608 may continue to mask the error signals received from the USB device physical layer for as long as the filtered EFT detection signal is in the logic positive state. Accordingly, the MASK block 608 may continue to mask the error signals received from the USB device physical layer while the input to the USB device continues to experience common mode noise disturbances at a certain frequency or within a certain time period, since the filtered EFT detection signal remains in a logic positive state when common mode noise disturbances are occurring.

The logic block 616 may comprise a combination logic block to combine inputs to the logic block 616. The logic block 616 may receive a filtered common up coarse signal from the filter 612, a filtered common down coarse signal from the filter 614, the filtered EFT detection signal from the filter 602, or any combination thereof. The logic block 616 may output a common up shift signal Shift_CM_up and a common down shift signal Shift_CM_dn. The common up shift signal may indicate that the common mode voltage of the input to the USB device should be adjusted and/or shifted to a lower voltage and the common shift down signal may indicate that the common mode voltage of the input to the USB should be adjusted and/or shifted to a higher voltage.

The logic block 616 may provide and/or maintain the common up shift signal and the common down shift signal both in a logic negative state in response to determining the EFT detection signal is in a logic negative state. Accordingly, the logic block 616 is masking the filtered common up coarse signal and the filtered common down coarse signal in response to determining that the EFT detection signal is in a logic negative state. The logic block 616 may continue to maintain the common up shift signal and the common down shift signal in a logic negative state while the input to the USB device is not experiencing common mode noise disturbances, since the filtered EFT detection signal remains in a logic negative state when common mode noise disturbances are not occurring.

When the EFT detection signal is in a logic positive state, the logic block 616 may generate the common up shift signal Shift_CM_up and common down shift signal Shift_CM_dn based on the filtered common up coarse signal and the filtered common down coarse signal, respectively. The common up shift signal Shift_CM_up may follow the filtered common up coarse signal, such that when the common up coarse signal is in a logic positive state, the common up shift signal is in a logic positive state and when the common up coarse signal is in a logic negative state, the common up shift signal is in a logic negative state. Further, when the EFT detection signal is in a logic positive state, the logic block 616 may generate a common down shift signal Shift_DM_dn that follows the filtered common down coarse signal.

The common mode controller 618 may receive the common up shift signal and the common down shift signal from the logic 616. The common mode controller 618 may generate a control signal instructing a driver 620 to either increase or decrease the common mode voltage of the input of the USB device based on the common up shift signal and/or the common down shift signal. The control signal may instruct the driver 620 to decrease the common mode voltage of the input when the common up shift signal is in a logic positive state and increase the common mode voltage of the input when the common down shift signal is in a logic positive state. When the common up shift signal and the common down shift signal are either both in a logic negative state or both in a logic positive state, the control signal may instruct the driver 620 to maintain the common mode voltage of the input.

The driver 620 may include a receiver (RX) front end pre-driver. The driver 620 may receive an input to the USB device (e.g., the USBDP and USBDM signals), and output an adjusted USBDP signal Adj_USBDP and an adjusted USBDM on line Adj_USBDM. The adjusted USBDP signal and the adjusted USBDM signal may be generated based on the control signal from the common mode controller 618 and the USBDP and USBDM signals. In response to the control signal from the common mode controller 618 indicating that the common mode voltage of the input to the USB device should be increased, the driver 620 may generate the adjusted USBDP signal and the adjusted USBDM signal by adjusting and/or increasing a voltage level of the USBDP signal, a voltage level of the USBDM signal, or any combination thereof, to produce the increased common mode voltage. Further, in response to the control signal from the common mode controller 618 indicating that the common mode voltage of the input to the USB device should be decreased, the driver 620 may generate the adjusted USBDP and the adjusted USBDM by adjusting and/or increasing the voltage level of the USBDP signal, the voltage level of the USBDM line, or any combination thereof, to produce the decreased common mode voltage.

Based on the control signal, the driver 620 may be instructed to adjust the common mode voltage to within a pre-defined range. The pre-defined range may correspond to, for example, an operation range of the USB device, within a range for a specification rating voltage for the common mode voltage, a reference voltage range defined by the Vrefp signal and the Vrefm signal of FIG. 4, or any combination thereof. The adjusted common mode voltage may be provided to the USB device physical layer, a media access control component of the USB device, any other components of the USB device, or any combination thereof.

Figure 7:
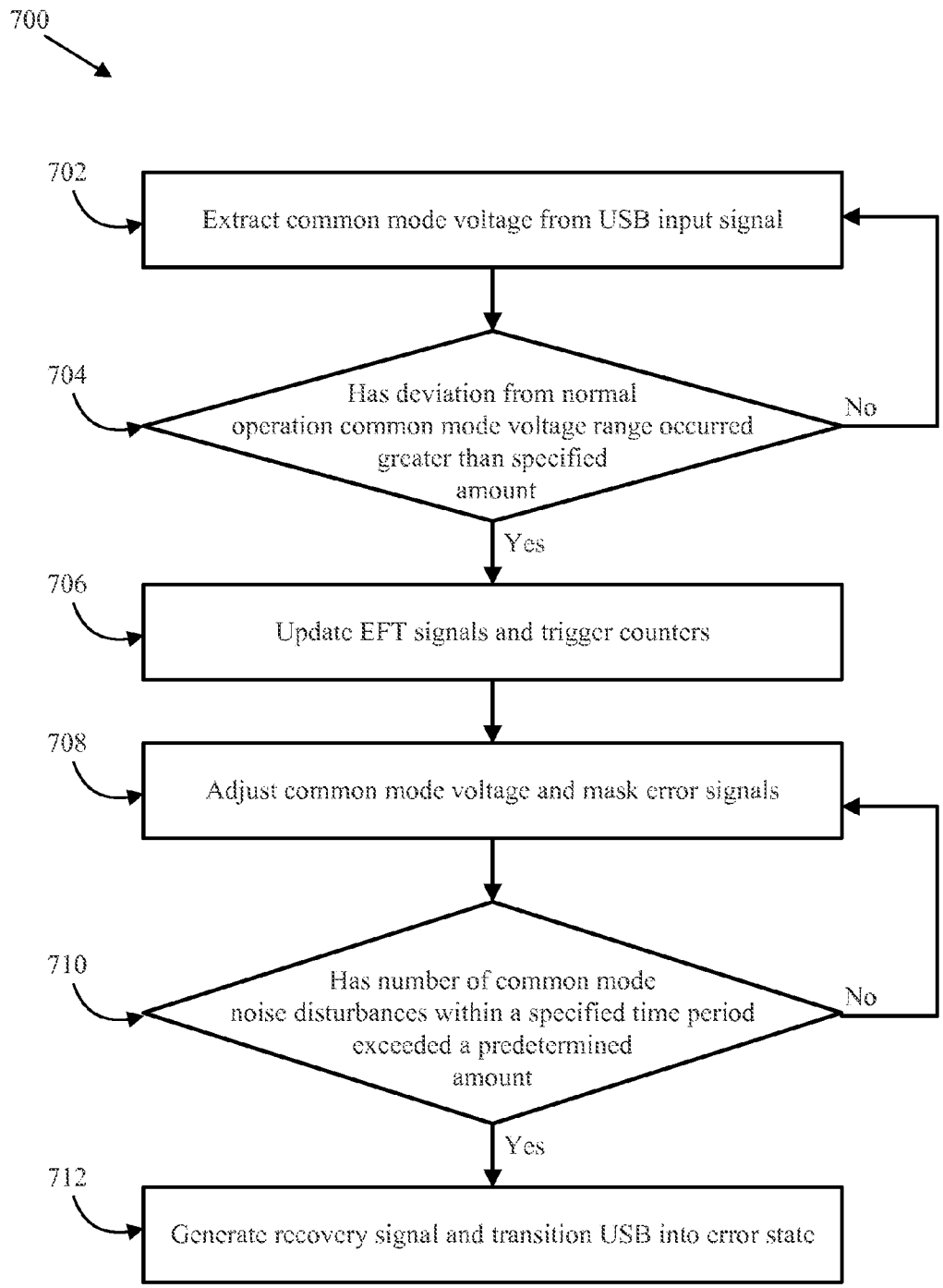
FIG. 7 illustrates an example process for common mode compensation, according to various embodiments.

Referring now to FIG. 7, wherein an example process 700 for common mode compensation, according to various embodiments, is shown. In some embodiments, the process 700 may be performed by a common mode compensation circuit, such as common mode compensation circuit 200. The common mode compensation circuit may include one or more of the circuitry described throughout this disclosure, such as the common mode extractor circuitry 400, detection and comparison circuitry 500, processing circuitry 600, or any combination thereof.

The process 700 may begin at block 702, where the common mode compensation circuit monitors a USB input signal. A USB device coupled to the common mode compensation circuitry may be in a normal operation state with error signals of the USB device being in a non-error state. At block 702 of the process 700, the common mode compensation circuit may extract a common mode voltage from the USB input signal. The common mode compensation circuit may compare the extracted common mode voltage to a positive reference voltage and/or a negative reference voltage to determine whether the common mode voltage is outside of a normal operation common mode voltage range. The common mode voltage signal may be extracted and compared with the reference voltages by common mode extractor circuitry, such as the common mode extractor circuitry 204 (FIG. 2) and/or the common mode extractor circuitry 400 (FIG. 4). Further, block 702 may include one or more of the processes performed by the common mode extractor circuitry 204, the common mode extractor circuitry 400 and/or any other process for extracting the common mode voltage and/or performing the comparison described throughout this disclosure.

At block 704 of the process 700, a determination whether the common mode voltage has deviated from a normal operation common mode voltage range greater than a specified amount may be performed. The specified amount may be one and block 704 may involve determining whether a common mode voltage of the USB device exceeded the positive reference voltage and/or dropped below a negative reference voltage more than the specified amount. In some embodiments, block 704 may involve determining whether a number of common mode disturbances, common mode disturbance being indicated by a positive peak exceeding the positive reference voltage and a corresponding negative peak less than the negative reference voltage, exceed the specified amount. In response to a determination at block 704 that the common mode voltage has deviated an amount of times greater than the specified amount, the process may continue to block 706. Otherwise, it is determined at block 704 that the common mode voltage has not deviated more than, or the amount of deviations is equal to, the specified amount, the process returns to block 702.

The determination at block 704 may be performed by detection and comparison circuitry, such as detection and comparison circuitry 206 (FIG. 2), detection and comparison circuitry 500 (FIG. 5), or any combination thereof. Further, block 704 may include one or more of the processes performed by the detection and comparison circuitry 206, the detection and comparison circuitry 500, and/or any other process for determining an amount of common mode voltage deviations described throughout this disclosure.

At block 706 of the process 700, EFT signals may be updated and/or generated and counters associated with the EFT signals may be triggered causing the counters to initiate counting from an initial state. The EFT signals may include the EFT signal, as shown in FIGS. 2, 3 (EFT detection signal 308), 5 and 6, the common mode PWM signal, as shown in FIGS. 2, 3 (common mode PWM signal 310), 5 and 6, or any combination thereof. A logical state of the EFT signals may be updated and/or generated based on the determination of block 704 and/or in accordance with the descriptions of the EFT signals and/or PWM signals described throughout this disclosure, At block 708 of the process 700, a common mode voltage of a physical layer of the USB device, such as USBPHY 202, may be adjusted and/or modified. Error signals of the USB device, such as squelch, Rx detect and disconnect signals of FIG. 1 and Reset, suspend, Rx detect and disconnect signals of FIG. 6, may be masked. The processes of block 708 may be performed by processing circuitry, such as processing circuitry 208, processing circuitry 600, or any combination thereof. Further, adjusting and/or modifying the common mode voltage and masking the error signals may be performed in accordance with one or more of the processes performed by the processing circuitry 208, the processing circuitry 600 and/or any other process for adjusting and/or modifying the common mode voltage and making the error signals described throughout this disclosure.

At block 710 of the process 700, the common mode compensation circuit may determine whether a number of common mode noise disturbances within a specified time period exceeds a predetermined amount and/or a frequency of the common mode noise disturbances exceeds a predetermined frequency. The determination of block 710 may be performed by processing circuitry, such as the processing circuitry 208, the processing circuitry 600, or any combination thereof. Further, the determination may be performed in accordance with one or more of the processes performed by the processing circuitry 208, the processing circuitry 600 and/or any other process for determining a number of common mode noise disturbances within a specified time period described throughout this disclosure. If the common mode compensation circuit determines that the number of common mode noise disturbances within the specified time period is less than or equal to the predetermined amount, the process 700 returns to block 708. Otherwise, if the common mode compensation circuit determines that the number of common mode noise disturbances within the specified time period exceeds the predetermined amount, the process 700 continues to block 712.

At block 712 of the process 700, recovery signals and/or error signals may be generated and/or updated and the USB device may transition into an error state. The recovery signals and/or error signals may include replacement disconnect signal hsdiscon and USB recovery signal USB_recov of FIG. 2, USB recovery signal 312 of FIG. 3, squelch, replacement disconnect signal hsdiscon and USB recovery signal of FIG. 6, or any combination thereof. In block 712, the recovery signals and/or error signals may be generated and/or updated to indicate that the USB device should enter an error state and the common mode circuitry should enter a recovery mode. Accordingly, the USB device may transition into an error state based on the recovery signals and/or error signals.

One or more operations of block 712 may be performed by processing circuitry, such as processing circuitry 208 (FIG. 2), processing circuitry 600 (FIG. 6), or any combination thereof. Further, generating and/or updating the recovery signals and/or error signals and transitioning the USB device into an error state may be performed in accordance with one or more of the processes performed by the processing circuitry 208, the processing circuitry 600 and/or any other process for generating and/or updating the recovery signals and/or error signals and transitioning the USB device into an error state described throughout this disclosure.

The USB device may remain in the error state until the recovery signals and/or error signals are reset to a non-error state. In response to the recovery signals and/or error signals being reset, the USB device may transition into a non-error state and the process may return to block 702.

Figure 8:
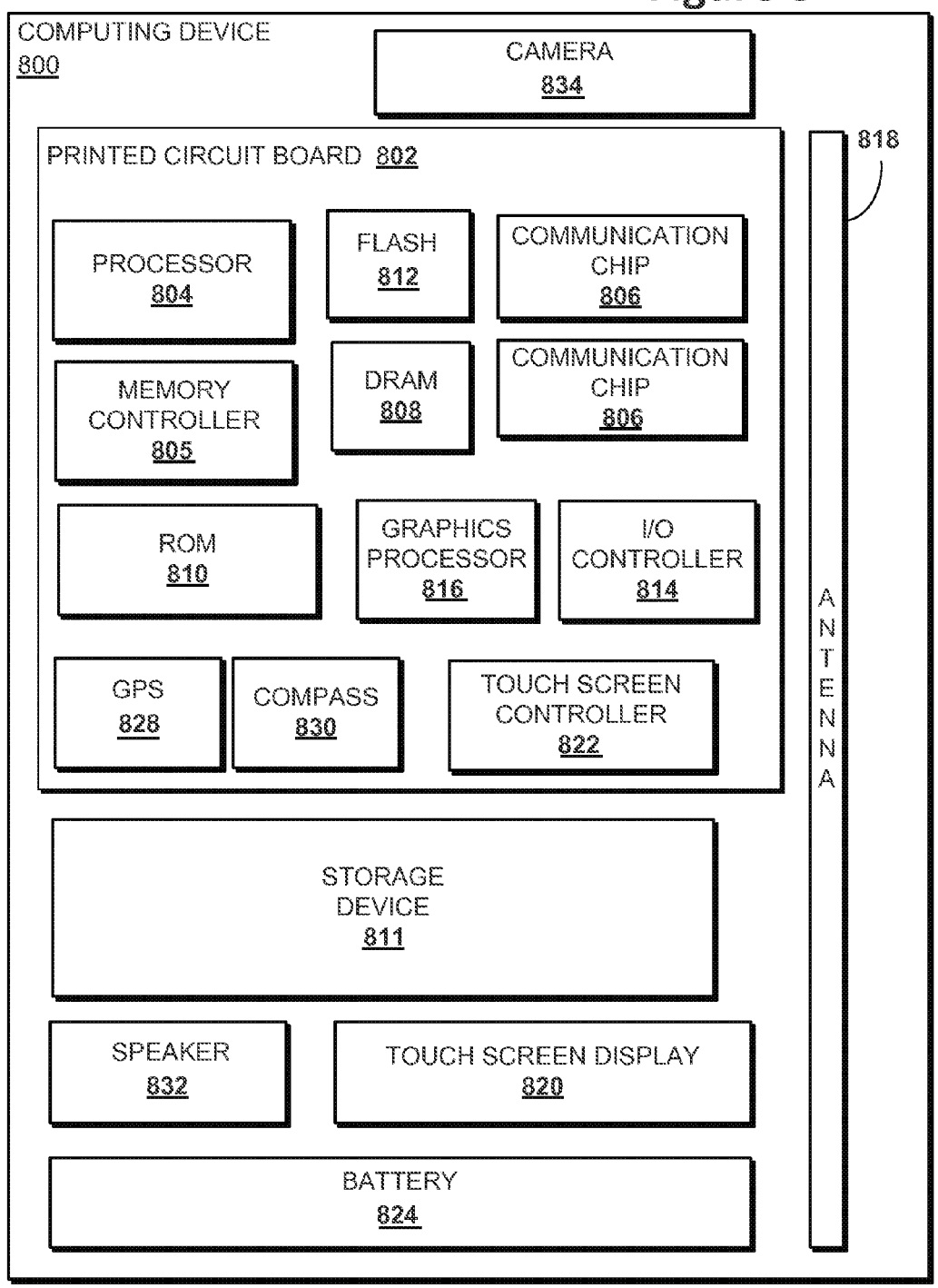
FIG. 8 illustrates an example computing device that may employ the apparatuses and/or methods described herein.

FIG. 8 illustrates an example computing device 800 that may employ the apparatuses and/or methods described herein (e.g., the common mode compensation circuit 200, the common mode extractor circuitry 400, the detection and comparison circuitry 500, and/or the processing circuitry 600), in accordance with various embodiments. As shown, computing device 800 may include a number of components, such as one or more processor(s) 804 (one shown) and at least one communication chip 806.

In various embodiments, the one or more processor(s) 804 each may include one or more processor cores. In various embodiments, the at least one communication chip 806 may be physically and electrically coupled to the one or more processor(s) 804. In further implementations, the communication chip 806 may be part of the one or more processor(s) 804. In various embodiments, computing device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computing device 800 may include other components that may or may not be physically and electrically coupled to the PCB 802. These other components include, but are not limited to, memory controller 805, volatile memory (e.g., dynamic random access memory (DRAM) 808), non-volatile memory such as read only memory (ROM) 810, flash memory 812, storage device 811 (e.g., a hard-disk drive (HDD)), an I/O controller 814, a digital signal processor (not shown), a crypto processor (not shown), a graphics processor 816, one or more antenna 818, a display (not shown), a touch screen display 820, a touch screen controller 822, a battery 824, an audio codec (not shown), a video codec (not shown), a global positioning system (GPS) device 828, a compass 830, an accelerometer (not shown), a gyroscope (not shown), a speaker 832, a camera 834, and a mass storage device (such as hard disk drive, a solid state drive, compact disk (CD), digital versatile disk (DVD)) (not shown), and so forth.

In some embodiments, the one or more processor(s) 804, flash memory 812, and/or storage device 811 may include associated firmware (not shown) storing programming instructions configured to enable computing device 800, in response to execution of the programming instructions by one or more processor(s) 804, to practice all or selected aspects of the methods described herein. In various embodiments, these aspects may additionally or alternatively be implemented using hardware separate from the one or more processor(s) 804, flash memory 812, or storage device 811.

In various embodiments, one or more components of the computing device 800 may include the common mode compensation circuit 200, the common mode extractor circuitry 400, the detection and comparison circuitry 500, and/or the processing circuitry 600 described herein. For example, the common mode compensation circuit 200, the common mode extractor circuitry 400, the detection and comparison circuitry 500, and/or the processing circuitry 600 may be included in I/O controller 814, processor 804, memory controller 805, and/or another component of computing device 800. In some embodiments, I/O controller 814 may interface with one or more external devices to receive a data signal using the common mode compensation circuit 200, the common mode extractor circuitry 400, the detection and comparison circuitry 500, and/or the processing circuitry 600. Additionally, or alternatively, the common mode compensation circuit 200, the common mode extractor circuitry 400, the detection and comparison circuitry 500, and/or the processing circuitry 600 may be used to receive a data signal transmitted between two components of the computing device 800.

The communication chips 806 may enable wired and/or wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computing device 800 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 800 may be any other electronic device that processes data.

Example 1 may include a system to withstand a common mode noise disturbance, comprising: a processor; common mode extraction circuitry to: extract a common mode voltage from an input signal for a input/output (I/O) communication device; compare the common mode voltage with a reference voltage range; and determine, based on the comparison, that the common mode voltage is outside of the reference voltage range; and processing circuitry coupled to the processor, the processing circuitry to adjust the common mode voltage to within the reference voltage range.

Example 2 may include the subject matter of example 1, wherein, to compare the common mode voltage with the reference voltage range, the common mode extraction circuitry is to compare the common mode voltage with a positive reference voltage and compare the common mode voltage with a negative reference voltage.

Example 3 may include the subject matter of example 2, wherein, to determine that the common mode voltage is outside the reference voltage range, the common mode extraction circuitry is to determine that the common mode voltage is greater than the positive reference voltage, and wherein the processing circuitry is to decrease the common mode voltage to adjust the common mode voltage to within the reference voltage range.

Example 4 may include the subject matter of example 2, wherein, to determine that the common mode voltage is outside the reference voltage range, the common mode extraction circuitry is to determine that the common mode voltage is less than the negative reference voltage, and wherein the processing circuitry is to increase the common mode voltage to adjust the common mode voltage to within the reference voltage range.

Example 5 may include the subject matter of any of the examples 1-4, wherein the processing circuitry is further to mask error signals generated by a physical layer of the USB device in response to the determination that the common mode voltage is outside of the reference voltage range.

Example 6 may include the subject matter of any of examples 1-5, further comprising comparison circuitry to count a number of times the common mode voltage exits the reference voltage range, wherein the processing circuitry is further to cause the I/O communication device to enter a recovery mode in response to determining that the number exceeds a predetermined number.

Example 7 may include the subject matter of the examples 1-6, wherein the I/O communication device is a universal serial bus device.

Example 8 may include an apparatus to withstand a common mode noise disturbance, comprising: extraction circuitry to: extract, from an input of an input/output (I/O) communication device, a common mode voltage signal; and identify, based on the extracted common mode voltage signal, at least one common mode noise disturbance on the input; and processing circuitry to shift a portion of the common mode voltage signal associated with the at least one common mode noise disturbance in response to the identification of the at least one common mode noise disturbance.

Example 9 may include the subject matter of example 8, wherein, to identify the at least one common mode noise disturbance, the extraction circuitry is to: identify a first portion of the common mode voltage signal that exceeds a positive reference voltage; and identify a corresponding second portion of the common mode voltage signal that exceeds a negative reference voltage.

Example 10 may include the subject matter of example 9, wherein to shift the portion of the common mode voltage signal, the processing circuitry is to: decrease a common mode voltage associated with the first portion of the common mode voltage signal to less than the positive reference voltage; and increase a common mode voltage associated with the second portion of the common mode voltage signal to greater than the negative reference voltage.

Example 11 may include the subject matter of any of the examples 9-10, wherein the positive reference voltage is 500 millivolts and the negative reference voltage is −50 millivolts.

Example 12 may include the subject matter of any of the examples 8-11, wherein the extraction circuitry is further to determine a duration of the at least one common mode noise disturbance, and wherein the processing circuitry is further to mask error outputs of a physical layer of the I/O communication device for at least the duration.

Example 13 may include the subject matter of any of the examples 8-12, wherein the extraction circuitry is further to identify, based on the extracted common mode voltage signal, additional common mode noise disturbances on the input, wherein the apparatus further comprises comparison circuitry to determine a frequency of the additional common mode noise disturbances, and wherein the processing circuitry is further to: determine whether the frequency is greater than a predetermined error frequency; and transmit, in response to determining that the frequency is greater than the predetermined error frequency, a recovery signal to the I/O communication device that causes the I/O communication device to transition into a suspend/reset state.

Example 14 may include the subject matter of any of the examples 8-12, wherein the extraction circuitry is further to identify, based on the extracted common mode voltage signal, additional common mode noise disturbances, wherein the apparatus further comprises comparison circuitry to count a number of common mode noise disturbances, including the at least one common mode noise disturbance and the additional common mode noise disturbances on the input, and wherein the processing circuitry is further to: determine whether the number of common mode noise disturbances is greater than a predetermined amount; and transmit, in response to determining that the number of EFT disturbances is greater than the predetermined amount, a recovery signal to the I/O communication device that causes the I/O communication device to transition into a suspend/reset state.

Example 15 may include the subject matter of any of the examples 8-14, wherein the extraction circuitry is further to: identify, based on the extracted common mode voltage signal, additional common mode noise disturbances on the input; and determine a time period encompassing the at least one common mode noise disturbance and the additional common mode noise disturbances, wherein the processing circuitry is further to mask error outputs of a physical layer of the I/O communication device for at least the time period.

Example 16 may include the subject matter of any of the examples 8-15, wherein the I/O communication device is a universal serial bus device.

Example 17 may include the subject matter of any of the examples 8-16, wherein the at least one common mode noise disturbance is at least one electrical fast transient disturbance.

Example 18 may include an apparatus to withstand a common mode noise disturbance, comprising: means for detecting, by a common mode compensation circuit, a common mode noise disturbance on an input signal of an input/output (I/O) communication device; means for determining a common mode voltage level of the input signal associated with the common mode noise disturbance; and means for shifting the common mode voltage level to within a predetermined voltage range.

Example 19 may include the subject matter of example 18, wherein the means for detecting the common mode noise disturbance comprises means for detecting, on the input signal, a positive peak voltage and a corresponding negative peak voltage associated with the common mode noise disturbance.

Example 20 may include the subject matter of example 19, wherein the means for detecting the common mode noise disturbance is to determine that the common mode noise disturbance is present if the positive peak voltage is greater than 500 millivolts and the corresponding negative peak voltage is less than −50 millivolts.

Example 21 may include the subject matter of example 18, wherein the means for detecting the common mode noise disturbance comprises: means for detecting that a common mode voltage of the input signal increased above a positive reference voltage; and means for detecting that the common mode voltage of the input signal decreased below a negative reference voltage.

Example 22 may include the subject matter of any of the examples 18-21, further comprising: means for identifying a time duration of the common mode noise disturbance; and means for masking error signals produced by a physical layer of the I/O communication device with non-error operation values for the time duration.

Example 23 may include the subject matter of any of the examples 18-22, further comprising means for identifying a time duration of the common mode noise disturbance, wherein the means for shifting the common mode voltage comprises means for shifting the common mode voltage during the time duration.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system, comprising:
a processor;
common mode extraction circuitry to:
  extract a common mode voltage from an input signal for a input/output (I/O) communication device;
  compare the common mode voltage with a reference voltage range; and
  determine, based on the comparison, that the common mode voltage is outside of the reference voltage range; and
processing circuitry coupled to the processor, the processing circuitry to:
  adjust the common mode voltage to within the reference voltage range; and
  mask error signals generated by a physical layer of the I/O communication device in response to the determination that the common mode voltage is outside of the reference voltage range.

2. The system of claim 1, wherein, to compare the common mode voltage with the reference voltage range, the common mode extraction circuitry is to compare the common mode voltage with a positive reference voltage and compare the common mode voltage with a negative reference voltage.

3. The system of claim 2, wherein, to determine that the common mode voltage is outside the reference voltage range, the common mode extraction circuitry is to determine that the common mode voltage is greater than the positive reference voltage, and wherein the processing circuitry is to decrease the common mode voltage to adjust the common mode voltage to within the reference voltage range.

4. The system of claim 2, wherein, to determine that the common mode voltage is outside the reference voltage range, the common mode extraction circuitry is to determine that the common mode voltage is less than the negative reference voltage, and wherein the processing circuitry is to increase the common mode voltage to adjust the common mode voltage to within the reference voltage range.

5. The system of claim 1, further comprising comparison circuitry to count a number of times the common mode voltage exits the reference voltage range, wherein the processing circuitry is further to cause the I/O communication device to enter a recovery mode in response to determining that the number exceeds a predetermined number.

6. The system of claim 1, wherein the I/O communication device is a universal serial bus device.

7. An apparatus, comprising:
   extraction circuitry to:
      extract, from an input of an input/output (I/O) communication device, a common mode voltage signal; and
      identify, based on the extracted common mode voltage signal, at least one common mode noise disturbance on the input, wherein to identify the at least one common mode noise disturbance includes to:
         identify a first portion of the common mode voltage signal that exceeds a positive reference voltage; and
         identify a corresponding second portion of the common mode voltage signal that exceeds a negative reference voltage; and
   processing circuitry to shift a portion of the common mode voltage signal associated with the at least one common mode noise disturbance in response to the identification of the at least one common mode noise disturbance.

8. The apparatus of claim 7, wherein to shift the portion of the common mode voltage signal, the processing circuitry is to:
   decrease a common mode voltage associated with the first portion of the common mode voltage signal to less than the positive reference voltage; and
   increase a common mode voltage associated with the second portion of the common mode voltage signal to greater than the negative reference voltage.

9. The apparatus of claim 7, wherein the positive reference voltage is 500 millivolts and the negative reference voltage is −50 millivolts.

10. The apparatus of claim 7, wherein the extraction circuitry is further to determine a duration of the at least one common mode noise disturbance, and wherein the processing circuitry is further to mask error outputs of a physical layer of the I/O communication device for at least the duration.

11. The apparatus of claim 7, wherein the extraction circuitry is further to identify, based on the extracted common mode voltage signal, additional common mode noise disturbances on the input, wherein the apparatus further comprises comparison circuitry to determine a frequency of the additional common mode noise disturbances, and wherein the processing circuitry is further to:
   determine whether the frequency is greater than a predetermined error frequency; and
   transmit, in response to determining that the frequency is greater than the predetermined error frequency, a recovery signal to the I/O communication device that causes the I/O communication device to transition into a suspend/reset state.

12. The apparatus of claim 7, wherein the extraction circuitry is further to identify, based on the extracted common mode voltage signal, additional common mode noise disturbances, wherein the apparatus further comprises comparison circuitry to count a number of common mode noise disturbances, including the at least one common mode noise disturbance and the additional common mode noise disturbances on the input, and wherein the processing circuitry is further to:
   determine whether the number of common mode noise disturbances is greater than a predetermined amount; and
   transmit, in response to determining that the number of common mode noise disturbances is greater than the predetermined amount, a recovery signal to the I/O communication device that causes the I/O communication device to transition into a suspend/reset state.

13. The apparatus of claim 7, wherein the extraction circuitry is further to:
   identify, based on the extracted common mode voltage signal, additional common mode noise disturbances on the input; and
   determine a time period encompassing the at least one common mode noise disturbance and the additional common mode noise disturbances, wherein the processing circuitry is further to mask error outputs of a physical layer of the I/O communication device for at least the time period.

14. The apparatus of claim 7, wherein the I/O communication device is a universal serial bus device.

15. The apparatus of claim 7, wherein the at least one common mode noise disturbance is at least one electrical fast transient disturbance.

16. An apparatus, comprising:
   means for detecting, by a common mode compensation circuit, a common mode noise disturbance on an input signal of an input/output (I/O) communication device, wherein the means for detecting the common mode noise disturbance comprises:
      means for detecting, on the input signal, a positive peak voltage and a corresponding negative peak voltage associated with the common mode noise disturbance;
      means for detecting that a common mode voltage of the input signal increased above a positive reference voltage; and
      means for detecting that the common mode voltage of the input signal decreased below a negative reference voltage;
   means for determining a common mode voltage level of the input signal associated with the common mode noise disturbance; and
   means for shifting the common mode voltage level to within a predetermined voltage range.

17. The apparatus of claim 16, wherein the means for detecting the common mode noise disturbance is to determine that the common mode noise disturbance is present if the positive peak voltage is greater than 500 millivolts and the corresponding negative peak voltage is less than −50 millivolts.

18. The apparatus of claim 16, further comprising:
   means for identifying a time duration of the common mode noise disturbance; and
   means for masking error signals produced by a physical layer of the I/O communication device with non-error operation values for the time duration.

19. The apparatus of claim 16, further comprising means for identifying a time duration of the common mode noise disturbance, wherein the means for shifting the common mode voltage comprises means for shifting the common mode voltage during the time duration.

20. The system of claim 1, wherein, to mask the error signals, the processing circuitry is to:

receive the error signals from the physical layer of the I/O communication device, wherein the error signals indicate that there is an error;

mask the error signals with signals that indicate there is no error in response to reception of the error signals that indicate there is an error; and provide the signals that indicate there is no error to the physical layer of the I/O communication device.

\* \* \* \* \*